(12) United States Patent
Chiang et al.

(10) Patent No.: US 9,431,146 B2
(45) Date of Patent: Aug. 30, 2016

(54) BATTERY ELECTRODES AND METHODS OF MANUFACTURE

(75) Inventors: Yet-Ming Chiang, Framingham, MA (US); Shen J. Dillon, Champaign, IL (US); Richard K. Holman, Belmont, MA (US)

(73) Assignee: A123 Systems LLC, Livonia, MI (US)

( * ) Notice: Subject to any disclaimer, the term of this patent is extended or adjusted under 35 U.S.C. 154(b) by 960 days.

(21) Appl. No.: 12/821,779

(22) Filed: Jun. 23, 2010

(65) Prior Publication Data

US 2010/0323244 A1 Dec. 23, 2010

Related U.S. Application Data

(60) Provisional application No. 61/219,586, filed on Jun. 23, 2009.

(51) Int. Cl.
| | |
|---|---|
| H01B 1/12 | (2006.01) |
| H01M 4/38 | (2006.01) |
| H01M 4/485 | (2010.01) |
| H01M 4/525 | (2010.01) |
| H01M 4/583 | (2010.01) |

(52) U.S. Cl.
CPC .......... *H01B 1/122* (2013.01); *H01M 4/38* (2013.01); *H01M 4/485* (2013.01); *H01M 4/525* (2013.01); *H01M 4/583* (2013.01); *Y02E 60/122* (2013.01); *Y02P 70/54* (2015.11)

(58) Field of Classification Search
USPC .............................................. 429/220, 218.2
See application file for complete search history.

(56) References Cited

U.S. PATENT DOCUMENTS

| | | | | |
|---|---|---|---|---|
| 3,749,607 | A * | 7/1973 | Jasinski et al. | 423/223 |
| 3,970,475 | A * | 7/1976 | Gerbier et al. | 429/338 |
| 4,489,143 | A | 12/1984 | Gilbert et al. | |
| 4,626,335 | A * | 12/1986 | Cupp et al. | 204/293 |
| 5,273,847 | A * | 12/1993 | Plichta et al. | 429/322 |
| 5,848,351 | A | 12/1998 | Hoshino et al. | |
| 6,805,996 | B2 | 10/2004 | Hosoya | |
| 7,338,734 | B2 | 3/2008 | Chiang et al. | |
| 7,348,101 | B2 | 3/2008 | Gozdz et al. | |
| 2001/0008735 | A1* | 7/2001 | Andrieu et al. | 429/306 |
| 2001/0009741 | A1* | 7/2001 | Durkot et al. | 429/229 |
| 2001/0053484 | A1* | 12/2001 | Takeuchi et al. | 429/231.4 |
| 2002/0197530 | A1* | 12/2002 | Tani et al. | 429/218.2 |
| 2003/0099884 | A1 | 5/2003 | Chiang et al. | |

(Continued)

FOREIGN PATENT DOCUMENTS

| | | |
|---|---|---|
| JP | 2008016196 A | 1/2008 |
| TW | 523956 B | 3/2003 |

OTHER PUBLICATIONS

Patent Office of Taiwan, Office action of Taiwanese Patent Application No. TW10321650730, Nov. 28, 2014, 8 pages.

(Continued)

*Primary Examiner* — Yoshitoshi Takeuchi
(74) *Attorney, Agent, or Firm* — Alleman Hall McCoy Russell & Tuttle LLP

(57) ABSTRACT

This disclosure relates to compositions and methods of manufacture of electrodes for batteries, including rechargeable lithium batteries, wherein at least one electrode comprises an electroactive material and a malleable metal. The electrode may be substantially free of other conductive additives and organic binders. Manufacture of the electrode may be performed without solvent or sintering.

60 Claims, 14 Drawing Sheets

(56) References Cited

U.S. PATENT DOCUMENTS

| | | | |
|---|---|---|---|
| 2003/0215717 A1* | 11/2003 | Miyaki | 429/232 |
| 2006/0240290 A1 | 10/2006 | Holman et al. | |
| 2007/0154805 A1* | 7/2007 | Zaghib et al. | 429/209 |
| 2008/0292953 A1* | 11/2008 | Hosaka et al. | 429/163 |
| 2009/0035664 A1* | 2/2009 | Chiang et al. | 429/317 |

OTHER PUBLICATIONS

International Search Report and Written Opinion for International Application No. PCT/US10/39629 mailed Sep. 1, 2010. 10 pages.

* cited by examiner

BATTERY ELECTRODES AND METHODS OF MANUFACTURE

RELATED APPLICATIONS

This application claims priority to U.S. Provisional Application No. 61/219,586, filed Jun. 23, 2009, the contents of which are incorporated by reference.

TECHNICAL FIELD

This disclosure relates to constructions for battery electrodes, materials used therein, electrodes and subassemblies for electrochemical cells—especially batteries—and methods of manufacture, and electrochemical cells using such electrodes and methods of manufacture.

BACKGROUND

Conventional practice in the design and manufacture of electrodes for batteries, especially rechargeable lithium batteries, involves the fabrication of powder-based electrodes in which the electrochemically active material is an ion-storage compound, but in which there is also a substantial amount of conductive additive, typically a high surface-area carbon, as well as an organic (polymeric) binder. In addition there is open porosity into which liquid electrolyte is infused to facilitate ion transport throughout the electrode.

Typical carbon additives and binders have low materials densities, e.g., <2.2 g/cm$^3$ and <1.5 g/cm$^3$, respectively, and take up a substantial volume fraction of the electrode. Thus, use of conductive additive and/or binder lowers the volume and mass fraction of the storage material in the electrode and degrades the energy density of the resulting cell.

Furthermore, electrodes are typically fabricated by suspending and/or dissolving said constituents including the active material powder, conductive additive, and binder in a solvent, coating the resulting suspension onto a metallic current collector, drying said coating, and pressing or calendaring said electrode before it is used to construct a cell of either the wound or stacked type. The manufacturing throughput for electrodes is limited by the time required for each of these steps, and especially the drying step during which solvent is removed.

SUMMARY

The present disclosure describes battery electrodes and methods of manufacture exploring alternatives to traditional conductive additives and solvents. Certain embodiments provide batteries having improved energy density and low manufacture time compared to batteries that employ traditional conductive additives and solvents.

In one aspect, the disclosure provides an electrode for an electrochemical cell. The electrode includes a particulate electroactive material and a particulate malleable metal that is electrochemically stable over the range of voltages experienced by the electroactive material during use. In certain embodiments, at least a portion of the metal particles form a conductive contact between the electroactive material particles. In some embodiments, the electrode is substantially free of other conductive additives and organic binders.

In some embodiments, the electrode has a volume percentage of the electroactive material that is greater than or equal to about 65%.

In some embodiments, the percentage of open porosity of the electrode is greater than or equal to about 10%.

In further embodiments, the electroactive material of the electrode has at least one particle size distribution. In certain embodiments, the $D_{50}$ (the median) of the particle size of the of the electroactive material ranges from about 0.1 μm to about 50 Ξm. In other embodiments, the $D_{50}$ ranges from about 0.5 μm to about 20 μm. In still other embodiments, the $D_{50}$ ranges from about 1 μm to about 10 μm.

In some embodiments, the particulate electroactive material of the electrode has a bi-modal or multi-modal particle size distribution.

In some embodiments, the electrode is a positive electrode. In some embodiments, the positive electroactive material is $LiCoO_2$. In some embodiments, the metal is aluminum. In other embodiments, the metal is titanium. In still other embodiments, the metal is platinum.

In other embodiments, the electrode is a negative electrode. In some embodiments, the electroactive material is graphite. In some embodiments, the metal is aluminum, copper, or nickel.

In further embodiments, the proportion of electroactive material to metal is from about 99.9:0.1 to about 75:25. In still further embodiments, the proportion of electroactive material to metal is from about 99.5:0.5 to about 80:20. In still other embodiments, the proportion of electroactive material to metal is from about 99:1 to about 85:15. In other embodiments, the proportion of electroactive material to metal is from about 99:1 to about 90:10. In even further embodiments, the proportion of electroactive material to metal is from about 99:1 to about 95:5.

In another aspect, an electrochemical cell is provided. The cell includes a first electrode, a second electrode, and an electrolyte, where the first electrode includes a first particulate electroactive material and a first particulate malleable metal. The first malleable metal is electrochemically stable over the range of voltages experienced by the first electroactive material during use. In some embodiments, at least a portion the first metal particles form a conductive contact between the first electroactive material particles. In some embodiments, the first electrode is substantially free of other conductive additives and organic binders.

In some embodiments, the first electrode is a positive electrode. In other embodiments, the first electrode is a negative electrode. In further embodiments, the second electrode is a positive electrode. In still further embodiments, the second electrode is a negative electrode.

In yet another aspect, a method of manufacturing an electrode for an electrochemical cell is provided. The method includes:

providing a first component including a particulate electroactive material;

providing a second component including a particulate malleable metal;

combining the first component and the second component to form a dry electrode composition; and applying compressive force to the dry electrode composition to form the electrode. In at least some embodiments, the dry electrode is substantially free of other conductive additives, organic binders, and solvents.

In some embodiments, the first component is a powder, and the method further includes milling at least a portion of the first component comprising the electroactive material.

In other embodiments, the second component is a powder, and combining the first component and the second component includes mixing.

In other embodiments, the compressive force is applied to the dry electrode composition while the composition is heated. In other embodiments, the compressive force is applied to the dry electrode composition while the composition is heated to a temperature lower than that needed to sinter the particles.

In further embodiments, the compressive force is applied to the dry electrode composition at room temperature.

In yet another aspect, an electrochemical cell is provided. The cell includes a positive electrode, and negative electrode, and an electrolyte, where the positive electrode and the negative electrode are each manufactured by:

providing a first component including a particulate electroactive material;

providing a second component including a particulate malleable metal;

combining the first component and the second component to form an electrode composition, substantially free of other conductive additive, organic binder, and solvent; and applying compressive force to the dry electrode composition to form the electrode.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In addition, the materials, methods, and examples are illustrative only and not intended to be limiting.

BRIEF DESCRIPTION OF THE DRAWINGS

The following figures are included for purposes of illustration only and are not intended to limit the scope of the claims.

DETAILED DESCRIPTION

Electrodes comprising an electroactive material and a malleable metal are described. The metal is electrochemically stable over the range of potentials experienced by the active material during use. In some embodiments, an electrode is substantially free of other conductive additives (besides the malleable metal) and organic binders. A dry (solventless) method for fabricating an electrode is also described. In certain embodiments, electrodes as described herein afford a reduced volume fraction of inactive materials, providing cells with improved energy density.

Figure 1:
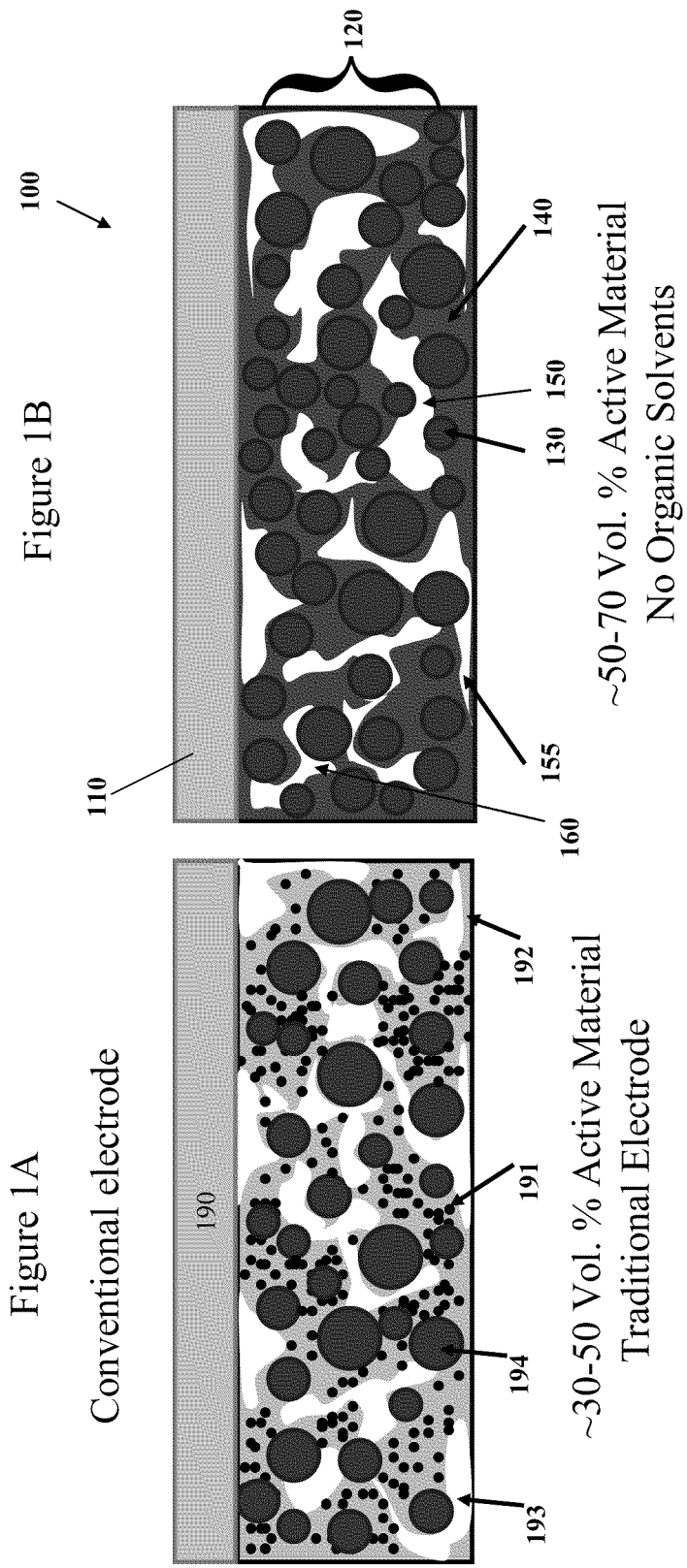
FIG. 1A shows schematically a cross-section of a conventional electrode.
FIG. 1B shows schematically a cross-section of a metal-bonded electrode according to certain embodiments of the present disclosure, comprising electroactive particles and metal binder.

In at least some embodiments, instead of using low-density conductive additives (such as carbon) and an organic binder, as illustrated in the conventional electrode in FIG. 1A, the functions of both are combined by using a single component material—a ductile, malleable metal selected to be electrochemically stable at the operating potential of the electrode. In various embodiments, this single multifunctional material can afford a higher electronic conductivity per unit mass and volume than the combined additives of conventional electrodes.

The malleable metal included in electrodes according to certain embodiments is selected to be malleable and electrically conductive. The malleable metal also is selected to be stable and electrochemically stable at the operating potential of the electrode, which means that the metal will not undergo electrochemical reaction and/or will not be chemically reactive to the other components of the electrode or battery under the operating conditions of the battery. Non-limiting examples of suitable malleable metals include copper, aluminum, titanium, nickel, and stainless steels.

FIG. 1B is a cross-sectional illustration of a metal-bonded electrode 100 according to one or more embodiments. The composite electrode includes a substrate 110, such as foil or grid, that serves as a current collector. The current collector typically is a thin metal sheet that is electrochemically inactive under the operating voltage of the electrode. The electrode layer 120 includes particles of electroactive material 130 that are interspersed with particles of a ductile metal binder 140. The electrode layer also includes void space 150 or porosity. The porosity may be open, as illustrated by void 155, or closed, as illustrated by void 160. The metal binder is electrically conductive and pliable or malleable, so that it can act as a lubricant. Malleability refers to the metal's ability to deform under mechanical stress; this is often characterized by the material's ability to conform to the outer surfaces of the electroactive particles when subjected to compression. In certain embodiments, the metal binder can coat the outer surfaces of the electroactive particles or it can form bridges between neighboring electroactive particles. In both instances, the metal serves to create a electrically conductive pathway between electroactive particles, which improves the overall conductivity of the electrode. The metal also serves to bind the electroactive particles and maintain the physical integrity of the electrode. When a single component of the electrode provides both conductive and binding functionality, the overall volume occupied by non-active materials can be reduced and the volume fraction of the active material increased. Surprisingly, in at least some embodiments, the overall porosity of an electrode as described herein is the same or greater than conventional electrodes that include a lower volume percent of active material. A conventional electrode including current collector (190), electroactive material particles (194), conductive additive such as carbon (191), pores (193), conductive additive particles (191) and binders (192) is shown in FIG. 1A for comparison.

In certain embodiments, by using multifunctional malleable metal that takes up less volume in the resulting electrode and cell than multiple individual additives (e.g., conductive additive, binder and solvent), electrodes can be obtained that have a higher volume percentage of ion storage material than conventional lithium ion battery electrodes. In addition, the electrodes according to certain embodiments herein can provide high mechanical integrity, as compared to conventional lithium ion battery electrodes.

Electrodes according to certain embodiments herein have a high percentage of electroactive material. In various embodiments, the volume percentage of active material in an electrode is greater than about 60%, greater than or equal to about 65%, greater than or equal to about 75%, or greater than or equal to about 85%. In contrast, conventional electrodes typically have only up to about 40-50% density (or up to about 50-60% density for "high density" conventional electrodes), due to the inclusion of components such as carbon and polymer binder.

In certain embodiments, the electrodes disclosed herein have the same or higher amounts of open porosity into which electrolyte can be infused, as compared to conventional electrodes. In various embodiments, the percent of open porosity in an electrode as described herein is greater than 5%, greater than 10%, greater than 15%, greater than 25%, greater than 35%, or greater than 45% as measured by a mercury porosimetry test "Open porosity" as used herein means pores or void volume within the electrode layer that is "open" or accessible to the external volume. Open porosity is capable of infiltration by liquid electrolyte or other liquids. Thus, in certain embodiments, due to the electrode's high percentage of electroactive material and porosity, the cells and battery systems comprising electrodes as disclosed herein have higher specific energy and energy density.

The electroactive material used to prepare an electrode as described herein can be any electroactive material that can be prepared in powder form. The electroactive material can be selected to have a particle size suitable for forming the desired particle packing of the electrode layer. The particles can range in size. As a non-limiting example, in one or more embodiments, the particles may be from about 30 nm to about 25 µm. In certain embodiments, the $D_{50}$ (the median) of the particle size of the electroactive material ranges from about 100 nm to about 50 µm. In other embodiments, the $D_{50}$ ranges from about 50 nm to about 20 µm. In still other embodiments, the $D_{50}$ ranges from about 1 µm to about 10 µm. The particle size distribution can be measured by methods well known to those skilled in the art, and may include, for example, light scattering methods. In some embodiments, the particles may be substantially monodisperse, with a single size range. Alternatively, particles of more than one size range, for example with bi-modal or multi-modal distributions, may be used. Without being bound by any particular theory, different or additional particle size distributions are thought to enable the particles to pack more tightly, resulting in higher density electrodes. Different particle sizes can be produced, for example, by dry ball-milling or jet-milling the electroactive powder.

Exemplary electroactive materials for the negative electrode in the case of a lithium working ion include graphitic or non-graphitic carbon, amorphous carbon, hard or disordered carbon, or mesocarbon microbeads; graphitic boron-carbon alloys; an unlithiated metal or metal alloy, such as metals including one or more of Ag, Al, Au, B, Ga, Ge, In, Sb, Sn, Si, or Zn, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions.

Exemplary electroactive materials for the positive electrode in a lithium system include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA"), Li(Ni, Mn, Co)$O_2$ (known as "NMC") and $Li_2MnO_3$—$LiMO2$ solid solutions or nanoscale composites in which M comprises one or more of Mg, V, Ti, Co, Ni, Mn, Fe. Other families of exemplary electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In one or more embodiments the active material comprises a transition metal polyanion compound, for example as described in U.S. Pat. No. 7,338,734. In one or more embodiments the active material comprises an alkali metal transition metal oxide or phosphate. For example, in some instances, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and x, y, z and a have values such that x, plus y(1−a) times a formal valence or valences of M', plus ya times a formal valence or valences of M", is equal to z times a formal valence of the $XD_4$, $X_2D_7$, or $DXD_4$ group; or the compound has a composition $(A_{1-a}M''_a)_x(XD_4)_z$, $(A_{1-a}M''_a)_xM'_y(DXD_4)z$ or $(A_{1-a}M''_a)_xM'_y(X_2D_7)_z$ and x, y, and a have values such that $(1-a)_x$ plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" is any of a Group IIA, IIIA, IVA, VA, VIA, VIIA, VIIIA, IB, IIB, IIIB, IVB, VB, and VIB metal, D is at least one of oxygen, nitrogen, carbon, or a halogen. In some embodiments, the positive electroactive material is an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. In some embodiments, M includes Fe and z is between about 0.15 and −0.15. In some instances, the material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). In some embodiments, the material may also exhibit a solid solution in the lithium-poor regime, e.g., where $x \geq 0.8$, or $x \geq 0.9$, or $x \geq 0.95$.

In some embodiments, the electrode material comprises a metal salt that stores an alkali ion by undergoing a displacement or conversion reaction. Examples of such compounds include metal oxides such as CoO, $CO_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulphide.

According to certain embodiments, an electrode is prepared by combining the electroactive material with a malleable metal. A cell can be prepared in which one or both of the positive and negative electrodes includes a malleable metal instead of the additional conductive additive and binder. As a non-limiting example, in a lithium rechargeable battery having an operating voltage of 2.5-5 V, aluminum may be used as the multifunctional additive in the positive electrode, and copper as the multifunctional additive in the negative electrode, or aluminum may be used as the current collector for the negative electrode if the negative electrode active material has a potential with respect to lithium metal that is greater than about 1V, so as to avoid electrochemical corrosion of the negative current collector.

In one or more embodiments, the metal is in particulate form, for example, having a $D_{50}$ particle size value ranging from about 0.1 µm to about 30 µm. In some embodiments, the metal has a $D_{50}$ particle size value ranging from about 0.5 µm to about 20 µm. In some embodiments, the metal has a $D_{50}$ particle size value ranging from about 1 µm to about 10 µm.

In some embodiments, an electrode including a malleable metal made by a process in which the malleable metal is added as a fine powder, and mixed with the electroactive powder (by hand, for example using a mortar and pestle, or by machine).

According to certain embodiments, an electrode is consolidated by dry compaction methods such as die pressing, rolling or calendaring, including processes referred to as roll-compaction. In some embodiments, the compaction comprises applying from about 10 kpsi to about 200 kpsi of pressure. As greater force is applied, the particles of the electrode pack more tightly together. The compressive force required to produce electrodes of the desired density and thickness depends, for example, on the particle sizes, size ranges, size ratios, and proportions of the electroactive material and malleable metal. The compressive force is applied long enough to reach a desired thickness or density. In some embodiments, the compressive force is applied for many minutes. In some embodiments, the desired thickness or density could be obtained instantaneously after the force is applied. In some embodiments, an electrode after the application of the compressive force has a thickness of from about 50 µm to about 5 mm.

In one or more embodiments, the compaction is performed at room temperature. Temperatures above room temperature may be used. However, in at least some embodiments, elevated temperatures such as those used for sintering are not used. Thus the resulting electrodes are distinguished from electrodes produced by sintering or by dry heat and extrusion (e.g., polymer electrodes). Surprisingly, using electrode compositions according to certain embodiments herein, electrodes of high density can be formed by cold (below sintering temperature) pressing.

In some embodiments, electrodes are prepared as a single part or as a larger part that is sectioned into single electrodes. In other embodiments, the electrodes are prepared in a continuous process in the form of sheet, plate, tape, film, or other continuous form that is then sectioned into individual electrodes. In some embodiments, the electrodes have a cross-section of uniform thickness. In other embodiments, the cross-section is nonuniform. In some embodiments, the electrodes have a reticulated or embossed surface. In some embodiments, the surface of the electrodes is formed to produce protrusions or indentations. Such protrusions and indentations may be in the form of parallel-sided or tapered posts, ridges, grooves, or other three-dimensional features.

According to certain embodiments, by eliminating solvent and using ambient pressure or compressive force for compaction, electrodes can be produced for lower cost and at higher speeds than conventional lithium ion battery electrodes. Additional steps such as drying of casting solvents in conventional battery fabricating methods also can be avoided.

Figure 2:
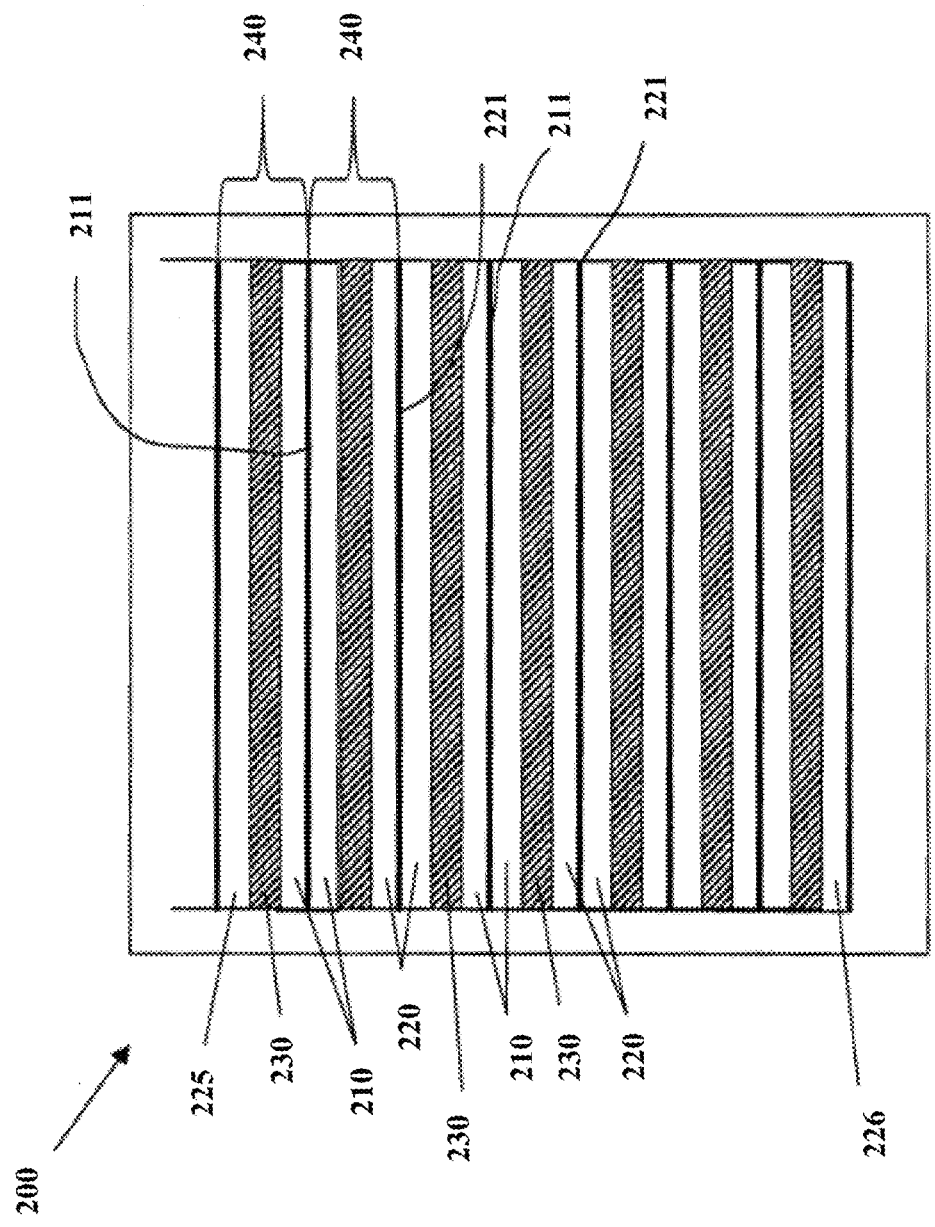
FIG. 2 is a cross-sectional view showing an exemplary lithium secondary cell having stacked electrodes.

The electrodes disclosed herein may be incorporated into electrochemical cells, for example nonaqueous electrolyte secondary batteries. A typical nonaqueous electrolyte secondary battery includes a battery element having elongated cathodes and elongated anodes, which are separated by elongated microporous separators and then are stacked together. A typical stacked cell is shown in FIG. 2 (reproduced from U.S. Pat. Appl. Pub. No. US 2006/0240290). The secondary cell 200 includes a double layer of anode material 210 coated onto both sides of an anode collector 211, a separator 230 and a double layer of cathode material 220 coated onto both sides of cathode collector 221 that have been stacked in this order. The repeated arrangement of positive electrode/separator/negative electrode forms multiple individual cells 240 bounded by a positive current collector and a negative current collector. Single-sided cathodes 225 and 226 on the outer two faces of the stacked assembly complete the stacked cell construction. The single-sided cathodes are bounded by a positive or negative current collector as appropriate for the cathode. These current collectors at the outer faces of the stacked assembly are coated on one side as shown in FIG. 2. The entire stacked assembly is infused with electrolyte (not shown). The use of stacked layers permits use of thicker electrodes to obtain higher energy capacity without the limits due to radius of curvature found in wound cells. In a typical stacked cell, 22 individual stacked cells 240 are included in a single battery. In some embodiments, about 2-30 individual stacked cells 240 are included in a single battery. In other embodiments, about 5-25 individual stacked cells 240 are included in a single battery. In further embodiments, about 15-25 individual stacked cells 240 are included in a single battery. In some embodiments, about 18 individual stacked cells 240 are included in a single battery. In other embodiments, about 20 individual stacked cells 240 are included in a single battery. In further embodiments, about 24 individual stacked cells 240 are included in a single battery.

A stacked assembly is made by alternately stacking positive and negative electrode layers with separator layers that electrically isolate the electrode layers, either manually or by employing an automated stacking machine. The stacked cell construction is activated with an electrolyte.

Typically, a nonaqueous electrolyte is used and may include an appropriate lithium salt dissolved in a nonaqueous solvent. The electrolyte may be infused into the porous separator 230 that spaces apart the positive and negative electrodes. Numerous nonaqueous organic solvents are known to be used as the components of Li-ion battery electrolytes, for example, a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other non-aqueous solvents that can be used as components of Li-ion battery electrolyte solutions include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

A solid or gel electrolyte may also be employed. The electrolyte may be an inorganic solid electrolyte, e.g., LiN or LiI, or a high molecular weight solid electrolyte, such as a gel, provided that the materials exhibits lithium conductivity. Exemplary high molecular weight compounds include poly(ethylene oxide), poly(methacrylate) ester based compounds, or an acrylate-based polymer, and the like.

As the lithium salt, at least one compound from among $LiClO_4$, $LiPF_6$, $LiBF_4$, $LiSO_3$, $LiN(SO_2CF_3)_2$, $LiN(SO_2CF_2CF_3)_2$ and the like may be used. The lithium salt may be at a concentration, for example, from 0.5 to 1.5 M, or about 1.3 M.

Although the particular embodiment of a Li-ion battery described here relates to a stacked prismatic cell, it is to be understood that this is one illustrative embodiment and the present invention is not limited to such a battery construction. For example, other shapes and sizes, such as cylindrical, square, rectangular (prismatic) coin, button or the like may be used.

EXAMPLES

Example 1

Positive Electrodes Comprising $LiCoO_2$ and Aluminum Powder

Seimi SeLion® $LiCoO_2$ was used as the cathode-active material. The powder was used in its as-received state, as well as after dry ball-milling or jet-milling to reduce its particle size. Fine aluminum powder from Alfa Aesar® was used as the multifunctional malleable metal. The constituent dry powders were mixed by hand in a mortar and pestle for 10-20 minutes. The powder was then pressed in a half inch die at various pressures. The compositions shown in Table 1 were prepared.

TABLE 1

| Powder Formulation | Amount (grams) | Component |
| --- | --- | --- |
| Powder 2 | 0.207 g | jet milled $LiCoO_2$ |
|  | 0.643 g | unmilled $LiCoO_2$ |
|  | 0.150 g | Al powder 3-4.5 micron |
| Powder 1 | 0.1 g | Al powder 3-4.5 micron |
|  | 0.3 g | unmilled $LiCoO_2$ |
| Powder 3 | 0.281 g | ball milled $LiCoO_2$ |
|  | 0.569 g | unmilled $LiCoO_2$ |
|  | 0.081 g | Al powder 3-4.5 micron |

Figures 3A, 3B:
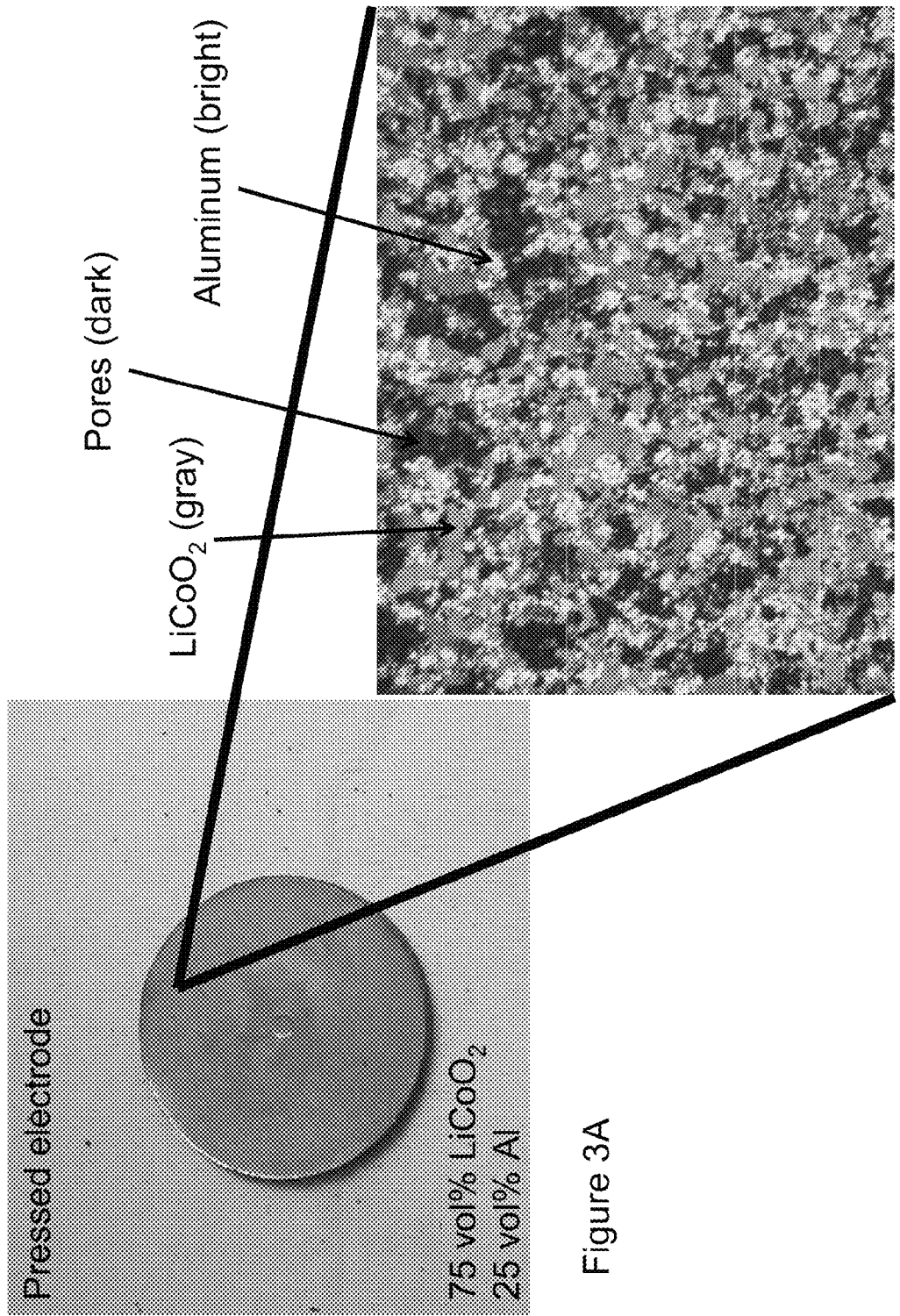
FIG. 3A shows a metal-bonded electrode in the as-pressed condition.
FIG. 3B shows an optical microscope image of a polished cross-section of this electrode.

Table 2 shows the results of density measurements obtained by the Archimedes method for pressed pellets. The volume percentage of active material (LiCoO2) ranged from 68.3% to 85%—in all cases larger than in conventional electrodes. At the same time, the amount of open porosity remained significant. The last column in Table 2 shows the capacity per unit area for cathodes of 250 μm thickness and having 145 mAh/g specific capacity (as shown by electrochemical testing using lithium half-cells). Notably, these values were all two to four times higher than the capacity per unit area of conventional LiCoO2 electrodes prepared from powder formulations. FIG. 3A shows a photograph of an as-pressed electrode of Sample 1, and FIG. 3B shows an optical microscope image of a polished cross-section of this electrode showing the aluminum phase (bright contrast), the LiCoO2 phase (gray), and the open porosity (dark contrast).

TABLE 2

| Sample ID | Die diam. | Pressure | Mass (g), Dry | Mass (g), Immersed | Mass (g), Wet | Sample Density (g/cm³) | Relative Density (%) | Open porosity (%) | Closed porosity (%) | Mass % LiCoO₂ | Vol % LiCoO₂ | 250 μm mAh/cm² |
|---|---|---|---|---|---|---|---|---|---|---|---|---|
| 1 | 0.5 in | 12000 lb | 0.135 | 0.109 | 0.138 | 3.654 | 82.4 | 10.3 | 7.3 | 75 | 68.3 | 6.25 |
| 2A | 0.5 in | 15000 lb | 0.313 | 0.256 | 0.324 | 3.613 | 81.5 | 16.2 | 2.3 | 85 | 75.3 | 10.7 |
| 2B | 0.5 in | 20000 lb | 0.598 | 0.489 | 0.615 | 3.726 | 84.1 | 13.5 | 2.4 | 85 | 75.3 | 11.1 |
| 3A | 0.5 in | 15000 lb | 0.225 | 0.18 | 0.234 | 3.271 | 70.1 | 16.7 | 13.2 | 91.3 | 85 | 10.5 |
| 3B | 0.5 in | 20000 lb | 0.208 | 0.172 | 0.215 | 3.797 | 81.4 | 16.3 | 2.3 | 91.3 | 85 | 12.1 |

Sample 2A was prepared for electrochemical testing by polishing on both sides to a thickness of about 250 μm, and removing approximately the same amount of material from each side, using 30 μm SiC abrasive. The thinned pellet was sectioned into smaller pieces for testing in a laboratory "Swagelok" cell vs. a Li metal negative electrode, using a conventional liquid electrolyte and microporous polymer separator (Celgard™ 2500). Two cells were prepared. The cells were charged using a constant current-constant voltage (CCCV) protocol: charging at a C/15 to C/16 galvanostatic rate to an upper voltage limit of 4.25 V, at which point the voltage was held constant and the current monitored until it decayed to a C/50 value. The charged cells were discharged to 2.5 V at various galvanostatic rates.

Figure 4:
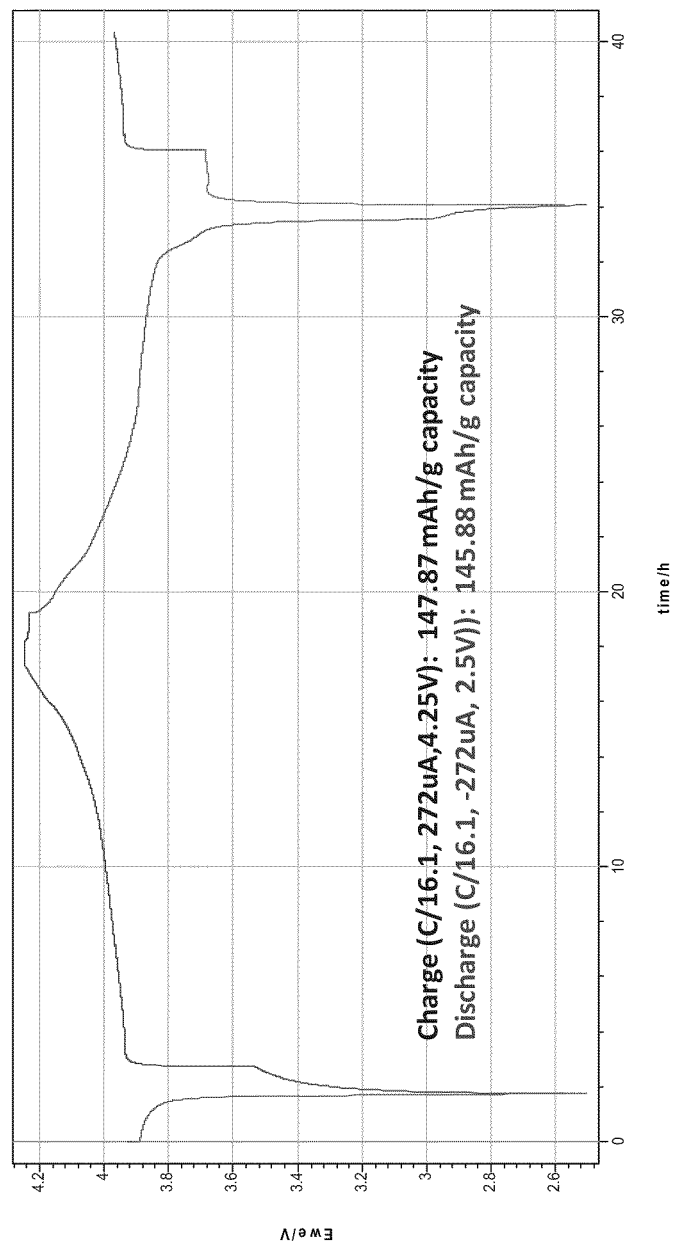
FIG. 4 shows a second charge-discharge cycle at C/16.1 rate for a positive electrode comprising $LiCoO_2$ and aluminum powder.

FIG. 4 shows the second charge-discharge curve for Sample 2B. Notably, the charge and discharge capacities of 148 mAh/g and 146 mAh/g, respectively, illustrate essentially complete utilization of the active material in the electrode.

The pressed electrodes were found to have high mechanical integrity compared to conventional electrode coatings used in lithium ion batteries, and could be handled without concern for fracture.

Figure 5:
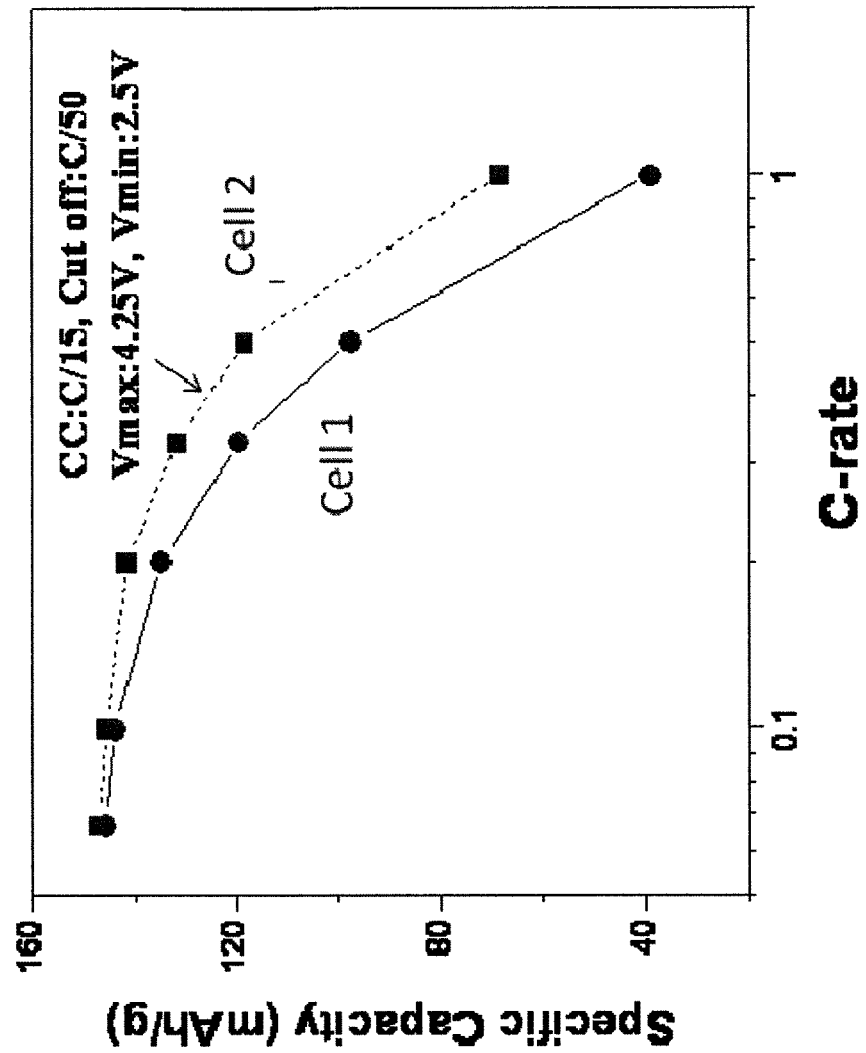
FIG. 5 shows discharge specific capacity vs. C-rate for two cells with a positive electrode comprising $LiCoO_2$ and aluminum powder.

FIG. 5 shows the specific capacity vs. C-rate for the cell of FIG. 4, as well as another cell made using Sample 2B, in which the CC part of the charge was at C/15 rate.

Results for both cells show excellent capacity retention with increasing C-rate for electrodes of such high volume packing density of active material and such large thickness (approximately twice the thickness of conventional electrodes).

Example 2

Heat Treated Electrodes

Figure 6A:
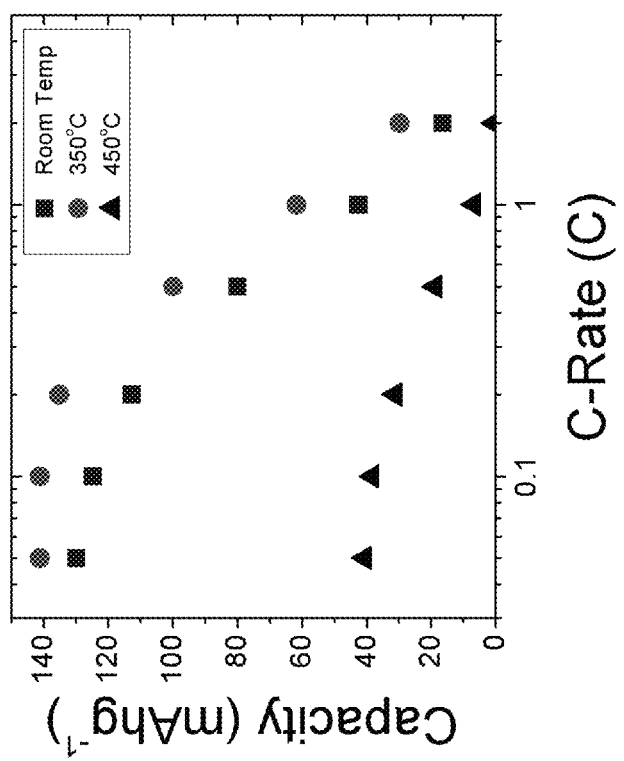
FIG. 6A shows the capacity vs. C-rate of a sample having 25 vol % Al, tested in a lithium half-cell with nonaqueous liquid electrolyte. Results for the sample tested in the as-prepared condition and after heat treating at 350° C. and 450° C. for 1 h are shown. Shown in FIG. 6B is the specific capacity of the $LiCoO_2$ component of the electrode upon electrochemical cycling.
Figure 6B:
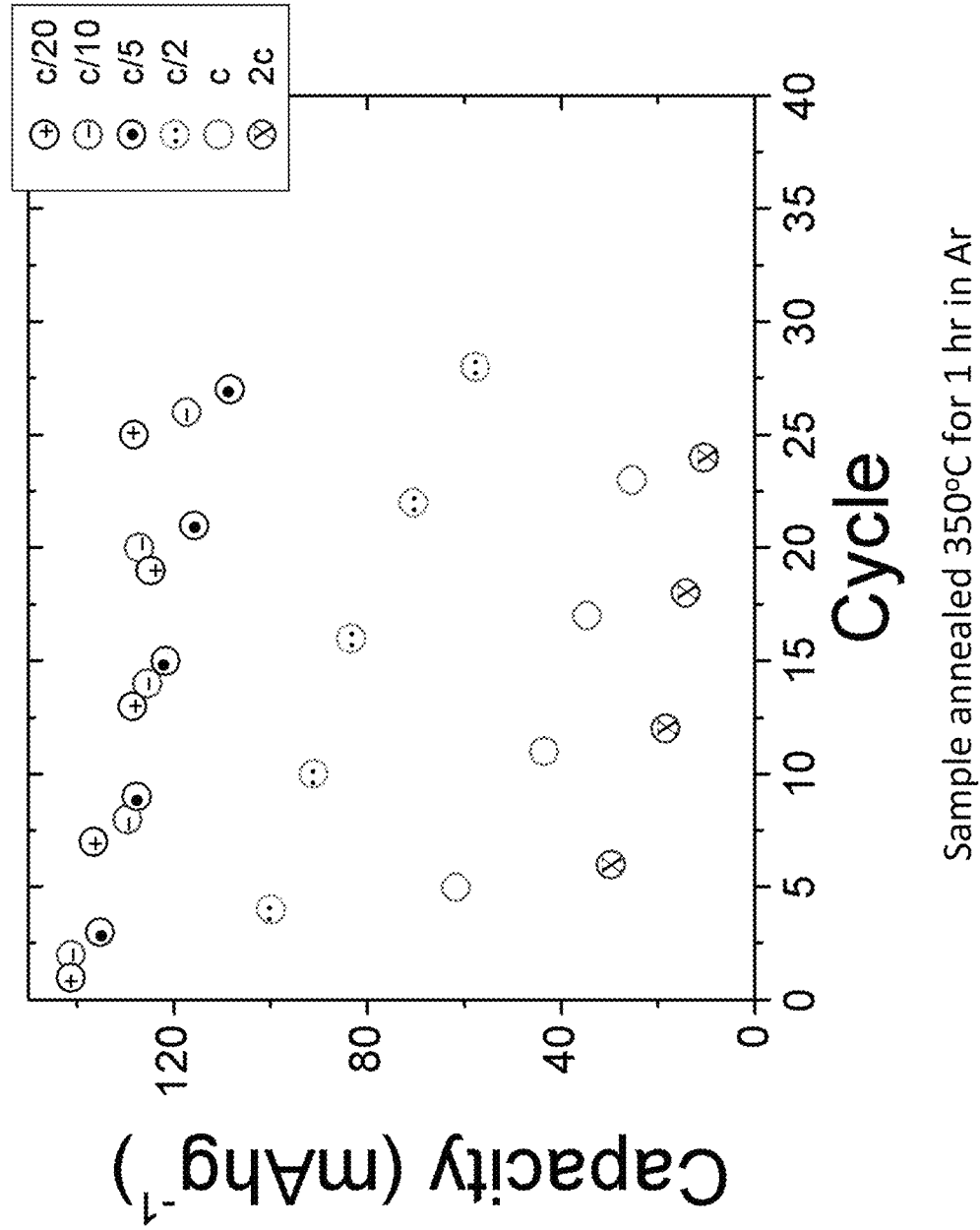

In this example, a positive electrode was prepared as in Example 1, and subsequently heat treated in argon gas at relatively low temperatures of 350° C. and 450° C., each for 1 h. The electrodes were then tested in lithium half-cells of the Swagelok type as in Example 1. FIG. 6A shows that heat treatment at 350° C. increased the specific capacity of the LiCoO₂ component at any given C-rate of testing. However, the capacity was degraded upon heating at 450° C. (or higher temperature for similar times, not shown). Without being bound by any particular interpretation, it is believed that aluminum metal, as a strong oxidizer, causes the cobalt in LiCoO₂ to become reduced and thereby decomposes or partially decomposes the cathode-active material. However, at 350° C. for 1 h, there is an improvement in bonding between the solid phases of the electrode without significant degradation by chemical reaction. Thus it is shown that heat treatment at temperatures too low to effect significant microstructural change, such as sintering, but which can nonetheless improve bonding between solid phases and/or improve the ductility of the metal phase by annealing of cold work, can nonetheless improve the performance of the electrodes. FIG. 6B shows the specific capacity of the LiCoO₂ component as the electrode heat treated at 350° C. was cycled in a protocol in which the lithium half-cell was cycled for one cycle each in succession at the rates of C/20, C/10, C/5, C/2, 1C, and 2C, and then the sequence was repeated.

Example 3

Electrode Comprising Lithium Titanate Spinel and Aluminum Powder

Figure 7A:
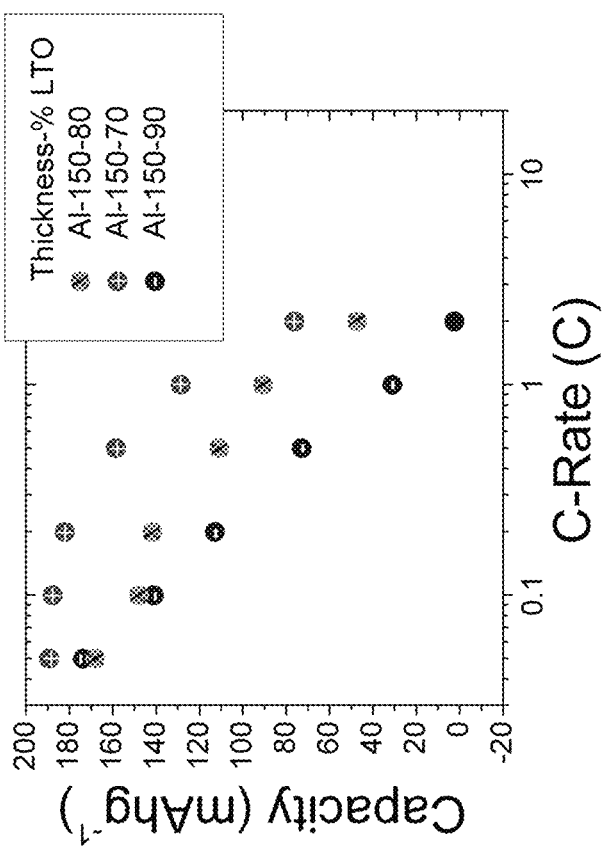
FIG. 7A shows the first lithium insertion and lithium extraction cycle in for one of the electrodes, prepared in a 150 µm thickness and tested in a lithium half-cell as described in Example 1. Shown in FIG. 7B is the specific capacity of the LTO phase vs. C-rate, all for 150 µm thick electrodes.
Figure 7B:
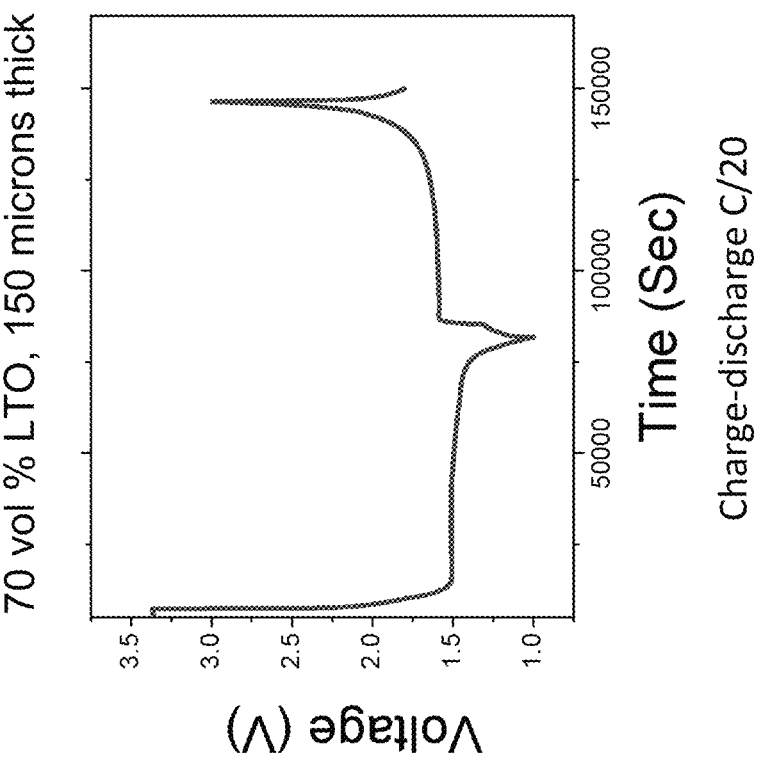

An electrode was prepared as in Example 1, but using a lithium titanate spinel (LTO) powder of approximate composition $Li_4Ti_5O_{12}$. The results are shown in FIGS. 7A & 7B and Table 3. The volume percentages of the LTO and the aluminum were 90%/10%, 80%/20%, and 70%/30%, and the electrodes were pressed at 76,000 psi, resulting in solids densities of 48.6%, 60.6%, and 67.9% of the theoretical density. The first lithium insertion and lithium extraction cycle is shown in FIG. 7A for one of the electrodes, prepared in a 150 μm thickness and tested in a lithium half-cell as described in Example 1. Shown in FIG. 7B is the specific capacity of the LTO phase vs. C-rate, all for 150 μm thick electrodes. It is seen that the highest capacity was measured for the sample having 70 vol % LTO and 30 vol % aluminum, and 32.1% porosity. Note that Al-150-80 represents an 150 μm thick electrode with Al as the metal binder with 80 vol % of electroactive material. Similarly, Al-150-70 represents an 150 μm thick electrode with Al as the metal binder with 70 vol % of electroactive material and Al-150-90 represents an 150 μm thick electrode with Al as the metal binder with 90 vol % of electroactive material.

TABLE 3

| Sample | Pressure | Density |
|---|---|---|
| 90/10 | 76,000 PSI | 48.6 |
| 80/20 | 76,000 PSI | 60.6 |
| 70/30 | 76,000 PSI | 67.9 |

Example 4

Negative Electrodes Comprising Graphite and Copper Powder

In this example, a negative electrode was made using natural graphite powder (Alfa Aesar® (microcrystal grade, APS 2-15 micron, 99.9995%)) and copper powder. Table 4 shows results for a series of experiments in which various ratios of Cu to graphite were mixed and pressed.

TABLE 4

| Sample | Pressure | Density | Relative Density |
|---|---|---|---|
| 100 vol %-Cu | 101,000 PSI | 7.504 | 83.8 |
| 38 vol %-Cu | 101,000 PSI | 5.57 | 78.7 |
| 26 vol %-Cu | 101,000 PSI | 5.255 | 84.6 |
| 8 vol %-Cu | 101,000 PSI | 3.088 | 78.6 |
| 6 vol %-Cu | 101,000 PSI | 2.841 | 77.6 |

Figure 8:
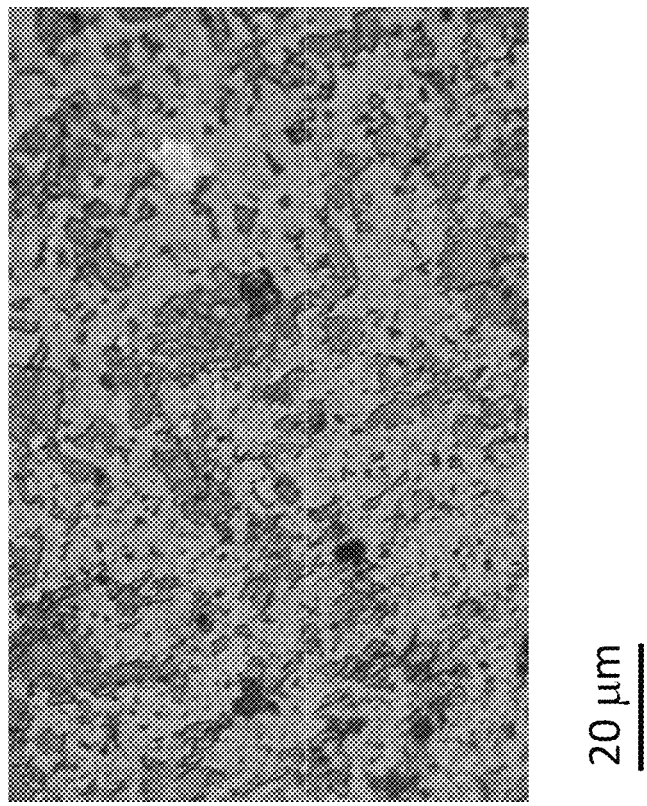
FIG. 8 shows an optical microscope image of a pressed Cu-graphite negative.
Figure 9:
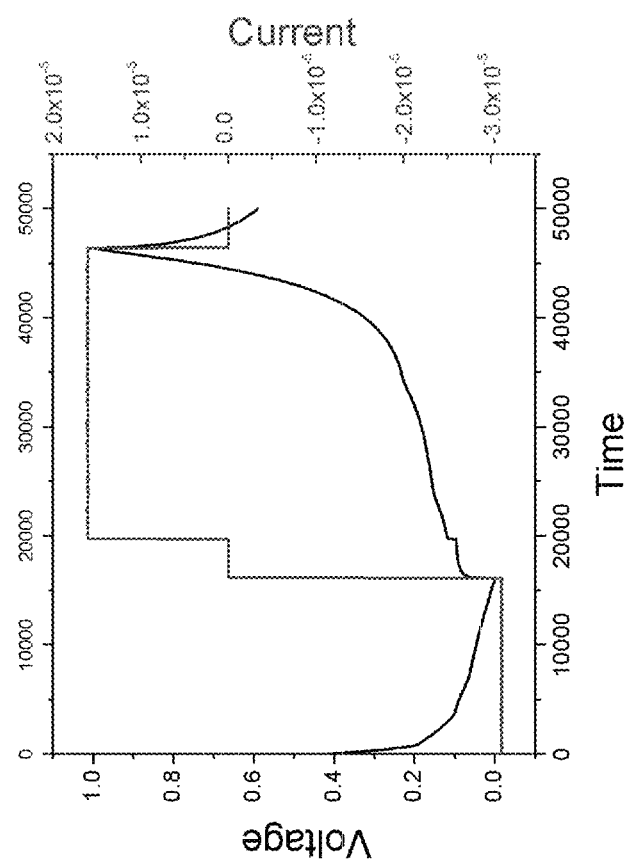
FIG. 9 shows electrochemical test data for a Cu-graphite negative electrode during the first galvanostatic lithium insertion, followed by an open-circuit (zero current) rest, followed by galvanostatic charging.

FIG. 8 shows an optical microscope image of a cross-section of one of the samples. Such electrodes were tested in lithium half-cells as described in Example 1. FIG. 9 shows the first galvanostatic lithium insertion, followed by an open-circuit (zero current) rest, followed by galvanostatic lithium extraction, for an electrode of 8 vol % Cu, 79% dense, and of about 100 µm thickness. It is shown that the electrode exhibited reversible lithium storage.

The graphite used here was not a "battery grade" graphite. However, from this example it is understood that such electrodes may be similarly prepared and used, using "battery grade" graphite anodes for lithium ion batteries such as Osaka Gas Company's MCMB 628 powder or Conoco-Philips G8 or G5 powder, and fine copper powder. The volume fractions of graphite and copper may be similar to those for $LiCoO_2$ and aluminum in Example 1, and the electrodes can be fabricated by dry pressing, in similar manner. The resulting electrodes can be tested in a lithium half-cell configuration, e.g., using Li metal as a negative electrode.

Example 5

Figure 10:
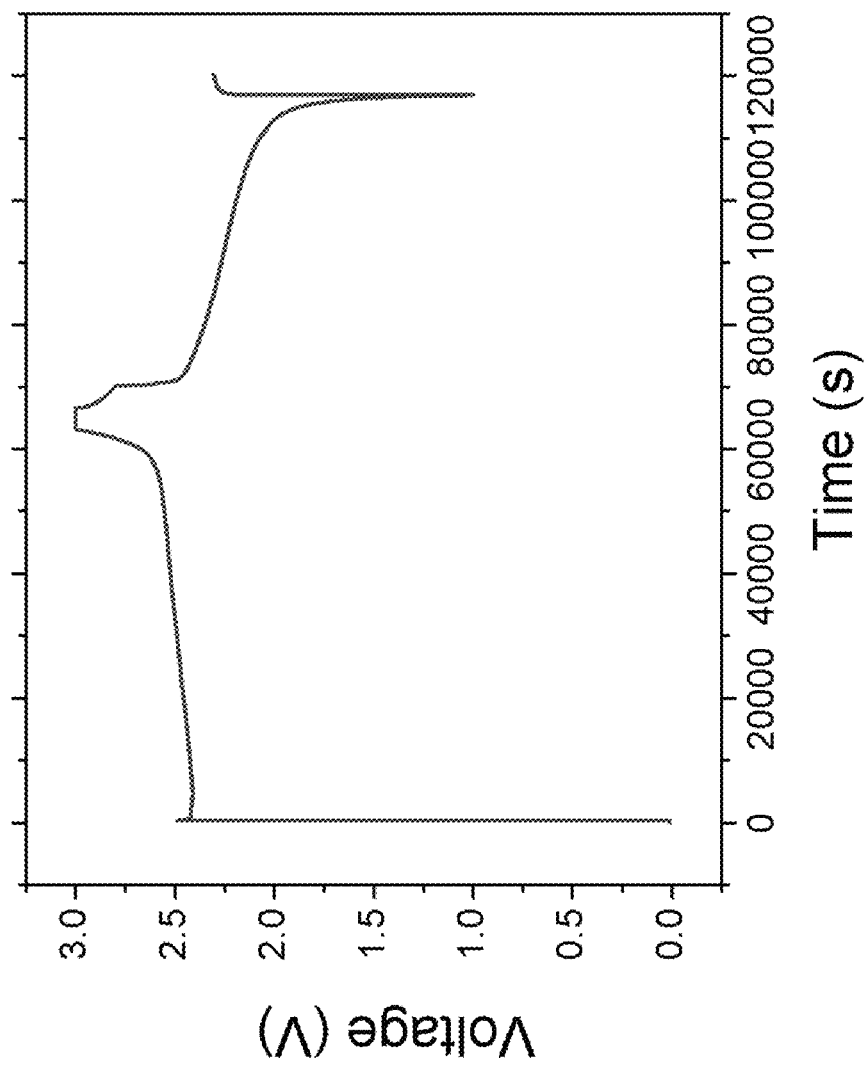
FIG. 10 shows the first charge-discharge cycle for a lithium-ion battery comprising $LiCoO_2$ (LCO) as the positive electrode active material and lithium titanate spinel (LTO) as the negative electrode active material, each electrode prepared as a mixture with aluminum.

Secondary Lithium Ion Battery using $LiCoO_2$, $Li_4Ti_5O_{12}$, and Graphite as Active Materials Positive and negative electrodes as described in the preceding examples were used together to prepare a lithium ion battery. FIG. 10 shows the first galvanostatic charge and discharge curve for such a battery prepared using ½" diameter discs of 230 micron Al-LCO, 81% dense pressed at 76 kpsi (103.8 mg) and 280 micron Al-LTO with 67% dense pressed at 76 kpsi (77.9 mg) electrodes. The cell had an excess of cathode capacity relative to anode capacity of 20%. As expected, the resulting cell showed a charge voltage of about 2.5V.

Figure 11:
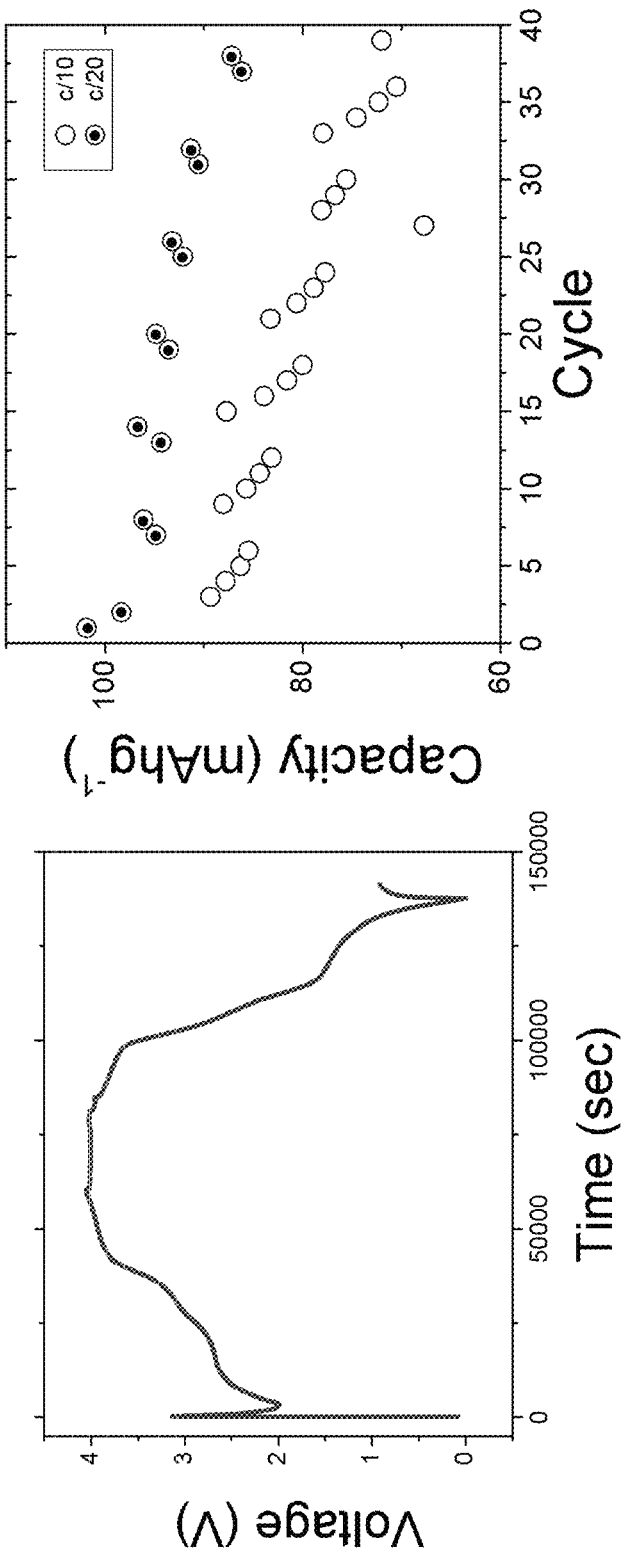
FIG. 11A shows the first charge-discharge cycle for a lithium-ion battery comprising $LiCoO_2$ (LCO) as the positive electrode active material and copper-graphite as the negative electrode active material, each electrode prepared as a mixture with aluminum. Shown in FIG. 11B is the specific capacity of the $LiCoO_2$ component as a function of cycling C-rate and number of cycles.

As another example, FIG. 11 shows results for a lithium ion cell prepared using 230 micron LCO-aluminum 81% dense pressed at 76 kpsi (105.2 mg) as the positive electrode and 350 micron Cu-graphite with 78.6% dense pressed at 101 kpsi (139.1 mg) as the negative electrode. The cell had an excess of cathode capacity relative to anode capacity of 20%. The first charge/discharge cycle for this cell is shown in FIG. 11A. FIG. 11B shows the specific capacity of the LiCoO2 component measured in protocol where the cell was cycled for two cycles at C/20 rate, followed by four cycles at C/10 rate, and the sequence repeated.

Example 6

Figure 12:
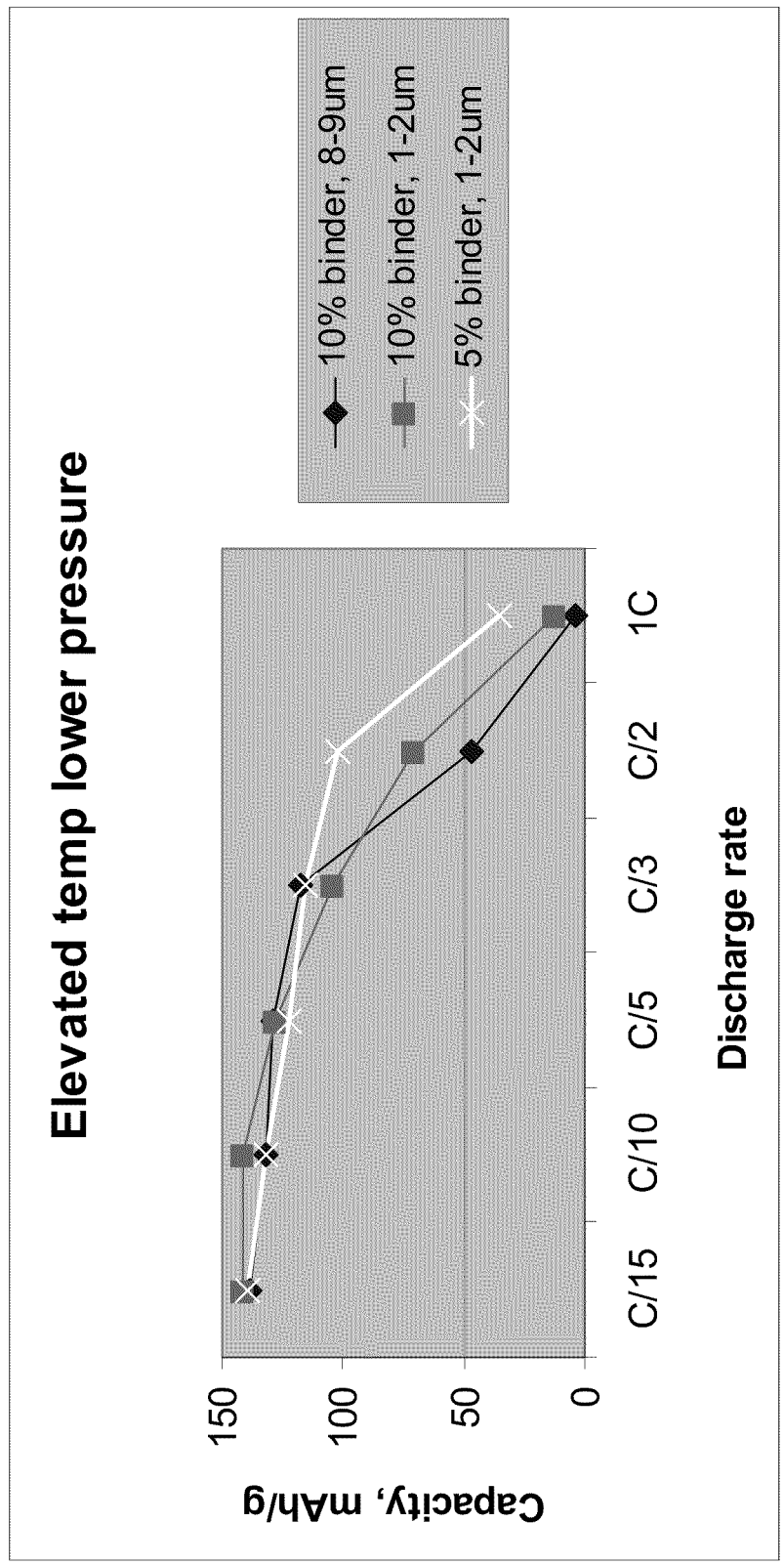
FIG. 12 shows the rate capability of LCO electrodes with varied Aluminum particle size and pressing temperature.

Varied Aluminum Particle Size, Pressing Temperature, and Pressure to Enable Reductions in Binder Content in the LCO—Al Pressed Electrode Design LCO cathodes implementing Al binder were prepared via pressing at room temperature and 400° C. using Al binder with 2 particle sizes (1-2 um and 8-9 um) and 2 volume fractions (5 and 10 vol. %), with the ultimate goal of reducing the total binder content to levels which deliver improved energy density over conventional electrodes (<~15%). Electrodes were prepared so as to be 340 µm thick (single side) with 20% porosity, and their rate capability was characterized in Li half cells. The best performing combinations of materials are show in FIG. 12, and the combination of 400° C. pressing, 5 vol. % Al binder, and 1-2 um Al particle size performed as well or better than electrodes containing much more Al binder (e.g. 25 vol. %).

Example 7

Figure 13:
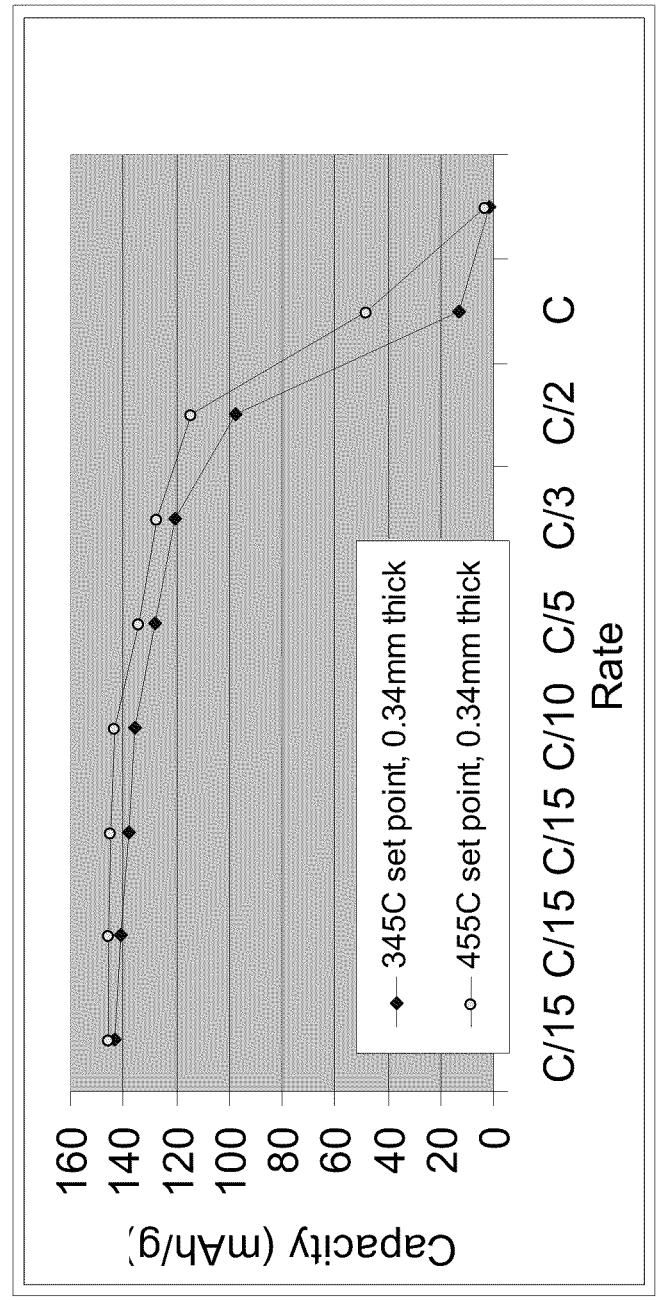
FIG. 13 shows the rate capability of LCO—Al electrodes pressed at a series of temperatures with a porosity of 25-27%.

LCO—Al Electrodes Prepared at a Series of Temperatures Using Fixed Formulation and at a Fixed Porosity A series of LCO—Al pressed electrodes was prepared using the formulation of Example 6 (5 vol % Al binder, Al D50 particle size=1-2 um), but at a series of temperatures and with a porosity of 25-27%. The rate capability of the samples was evaluated versus Li, the results of which are shown in FIG. 13. The sample pressed at a setpoint of 345° C. performed similarly to the 400° C. sample of example 6, whereas pressing at 455° C. resulted in a marked improvement in rate capability.

Those skilled in the art will readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. Accordingly, those skilled in the art will recognize that the use of an electrochemical device in the examples should not be limited as such. The present invention is directed to each individual feature, system, or method described herein. In addition, any combination of two or more such features, systems or methods, if such features, systems or methods are not mutually inconsistent, is included within the scope of the present invention.

The invention claimed is:

1. An electrode for an electrochemical cell, comprising a particulate electroactive material chosen from one of $LiCoO_2$, $LiCoO_2$ doped with Mg, $LiNiO_2$, NCA, $LiAlO_2$, NMC, graphitic carbon, Ag, Al, Au, B, Ga, Ge, In, Sb, Sn, Si or Zn, and a conductive binder comprising a particulate malleable metal having a $D_{50}$ particle size value ranging from about 0.5 µm to about 20 µm that is electrochemically stable over the range of voltages experienced by the electroactive material in use, wherein at least a portion of the metal particles form a conductive contact between at least a portion of the electroactive material particles, and wherein the electrode has greater than or equal to about 10% open porosity and wherein the electrochemical cell is a secondary cell.

2. The electrode of claim 1, consisting essentially of the particulate electroactive material and the particulate malleable metal.

3. The electrode of claim 1, wherein the electrode has a volume percentage of the electroactive material that is greater than about 60%.

4. The electrode of claim 1, wherein the electrode has a volume percentage of the electroactive material that is greater than or equal to about 65%.

5. The electrode of claim 1, wherein the electrode has a volume percentage of the electroactive material that is greater than or equal to about 75%.

6. The electrode of claim 1, wherein the electrode has a volume percentage of the electroactive material that is greater than or equal to about 85%.

7. The electrode of claim 1, having greater than or equal to about 15% open porosity.

8. The electrode of claim 1, having greater than or equal to about 25% open porosity.

9. The electrode of claim 1, having greater than or equal to about 35% open porosity.

10. The electrode of claim 1, having greater than or equal to about 45% open porosity.

11. The electrode of claim 1, wherein the particles of electroactive material have a $D_{50}$ particle size value ranging from about 0.5 µm to about 20 µm.

12. The electrode of claim 1, wherein the electroactive material has a bi-modal or multi-modal particle size distribution.

13. The electrode of claim 1, wherein the electrode is a positive electrode.

14. The electrode of claim 13, wherein the electroactive material is $LiCoO_2$, $LiCoO_2$ doped with Mg, $LiNiO_2$, NCA, $LiAlO_2$, or NMC.

15. The electrode of claim 14, wherein the electroactive material is $LiCoO_2$.

16. The electrode of claim 13, wherein the malleable metal is aluminum.

17. The electrode of claim 1, wherein the electrode is a negative electrode.

18. The electrode of claim 17, wherein the electroactive material is graphitic carbon, Ag, Al, Au, B, Ga, Ge, In, Sb, Sn, Si, or Zn.

19. The electrode of claim 18, wherein the electroactive material is graphitic carbon.

20. The electrode of claim 17, wherein the malleable metal is aluminum or copper.

21. The electrode of claim 1, wherein the mass proportion of electroactive material to metal is from about 99.9:0.1 to about 75:25.

22. The electrode of claim 1, wherein the mass proportion of electroactive material to metal is from about 99.5:0.5 to about 80:20.

23. The electrode of claim 1, wherein the mass proportion of electroactive material to metal is from about 99:1 to about 85:15.

24. The electrode of claim 1, wherein the proportion of electroactive material to metal is from about 99:1 to about 90:10.

25. The electrode for an electrochemical cell of claim 1, further comprising no other conductive additives or organic binders in the electrode.

26. An electrochemical cell, comprising a first electrode, a second electrode, and an electrolyte, wherein the first-electrode
(a) comprises a first particulate electroactive material chosen from one of $LiCoO_2$, $LiCoO_2$ doped with Mg, $LiNiO_2$, NCA, $LiAlO_2$, NMC, graphitic carbon, Ag, Al, Au, B, Ga, Ge, In, Sb, Sn, Si or Zn, and a first particulate malleable metal having a $D_{50}$ particle size value ranging from about 0.5 µm to about 20 µm that is electrochemically stable over the range of voltages experienced by the first electroactive material in use, wherein at least a portion of the first metal particles form a conductive contact between at least a portion of the first electroactive material particles, and
(b) has greater than or equal to about 10% open porosity; and wherein the electrochemical cell is a secondary cell.

27. The electrochemical cell of claim 26, wherein the first electrode has a volume percentage of the first electroactive material that is greater than about 60%.

28. The electrochemical cell of claim 26, wherein the first electrode has a volume percentage of the first electroactive material that is greater than about 65%.

29. The electrochemical cell of claim 26, wherein the first electrode has a volume percentage of the first electroactive material that is greater than about 75%.

30. The electrochemical cell of claim 26, wherein the first electrode has a volume percentage of the first electroactive material that is greater than about 85%.

31. The electrochemical cell of claim 26, wherein the first electrode has greater than or equal to about 15% open porosity.

32. The electrochemical cell of claim 26, wherein the first electrode has greater than or equal to about 25% open porosity.

33. The electrochemical cell of claim 26, wherein the first electrode has greater than or equal to about 35% open porosity.

34. The electrochemical cell of claim 26, wherein the first electrode has greater than or equal to about 45% open porosity.

35. The electrochemical cell of claim 26, wherein the particles of the first electroactive material have a $D_{50}$ particle size value ranging from about 0.5 µm to about 20 µm.

36. The electrochemical cell of claim 26, wherein the first electroactive material has a bi-modal or multi-modal particle size distribution.

37. The electrochemical cell of claim 26, wherein the first electrode is a positive electrode and the first electroactive material is $LiCoO_2$, $LiCoO_2$ doped with Mg, $LiNiO_2$, NCA, $LiAlO_2$, or NMC.

38. The electrochemical cell of claim 37, wherein the first electroactive material is $LiCoO_2$.

39. The electrochemical cell of claim 26, wherein the first electrode is a positive electrode and the first particulate malleable metal is aluminum.

40. The electrochemical cell of claim 26, wherein the first electrode is a negative electrode and the first electroactive material is graphitic carbon, Ag, Al, Au, B, Ga, Ge, In, Sb, Sn, Si, or Zn.

41. The electrochemical cell of claim 40, wherein the first electroactive material is graphite.

42. The electrochemical cell of claim 40, wherein the first particulate malleable metal is aluminum or copper.

43. The electrochemical cell of claim 26, wherein the mass proportion of the first electroactive material to the first malleable metal is from about 99.9:0.1 to about 75:25.

44. The electrochemical cell of claim 26, wherein the mass proportion of the first electroactive material to the first malleable metal is from about 99.5:0.5 to about 80:20.

45. The electrochemical cell of claim 26, wherein the mass proportion of the first electroactive material to the first malleable metal is from about 99:1 to about 85:15.

46. The electrochemical cell of claim 26, wherein the mass proportion of the first electroactive material to the first malleable metal is from about 99:1 to about 90:10.

47. The electrochemical cell of claim 26, wherein the second electrode comprises a second particulate electroactive material and a second particulate malleable metal that is electrochemically stable over the range of voltages experienced by the second electroactive material in use, wherein at least a portion of the second metal particles form a conductive contact between at least a portion of the second electroactive material particles, and wherein the second electrode is substantially free of other conductive additives and organic binders.

48. The electrode of claim 13, wherein the electrode contains lithium.

49. The electrode of claim 1, wherein the electrode contains lithium.

50. The electrochemical cell of claim 26, wherein the first electrode is a positive electrode.

51. The electrochemical cell of claim 50, wherein the first electrode contains lithium.

52. The electrochemical cell of claim 26, wherein the first electrode contains lithium.

53. The electrode of claim 1, wherein the secondary cell is capable of cycling at least 20 cycles at C/10 rate while retaining at least 80 percent of the initial capacity when cycled over a voltage range producing charge storage capacity of at least 40 mAh/g of the electroactive material.

54. The electrode of claim 53, wherein the secondary cell is capable of cycling at least 20 cycles at C/10 rate while retaining at least 80 percent of the initial capacity when cycled over a voltage range producing charge storage capacity of at least 80 mAh/g of the electroactive material.

55. The electrode of claim 54, wherein the secondary cell is capable of cycling at least 20 cycles at C/10 rate while retaining at least 80 percent of the initial capacity when cycled over a voltage range producing charge storage capacity of at least 120 mAh/g of the electroactive material.

56. The electrode of claim 55, wherein the secondary cell is capable of cycling at least 20 cycles at C/10 rate while retaining at least 80 percent of the initial capacity when cycled over a voltage range producing charge storage capacity of at least 140 mAh/g of the electroactive material.

57. The electrochemical cell of claim 26, wherein the secondary cell is capable of cycling at least 20 cycles at C/10 rate while retaining at least 80 percent of the initial capacity when cycled over a voltage range producing charge storage capacity of at least 40 mAh/g of the first electroactive material.

58. The electrochemical cell of claim 57, wherein the secondary cell is capable of cycling at least 20 cycles at C/10 rate while retaining at least 80 percent of the initial capacity when cycled over a voltage range producing charge storage capacity of at least 80 mAh/g of the first electroactive material.

59. The electrochemical cell of claim 58, wherein the secondary cell is capable of cycling at least 20 cycles at C/10 rate while retaining at least 80 percent of the initial capacity when cycled over a voltage range producing charge storage capacity of at least 120 mAh/g of the first electroactive material.

60. The electrochemical cell of claim 59, wherein the secondary cell is capable of cycling at least 20 cycles at C/10 rate while retaining at least 80 percent of the initial capacity when cycled over a voltage range producing charge storage capacity of at least 140 mAh/g of the first electroactive material.

* * * * *